US010986156B1

(12) United States Patent
Okuyama et al.

(10) Patent No.: US 10,986,156 B1
(45) Date of Patent: Apr. 20, 2021

(54) QUALITY PREDICTION APPARATUS, QUALITY PREDICTION METHOD AND PROGRAM

(71) Applicant: Nippon Telegraph and Telephone Corporation, Tokyo (JP)

(72) Inventors: Takafumi Okuyama, Musashino (JP); Seishou Yasukawa, Musashino (JP); Masataka Masuda, Musashino (JP); Kenichi Endou, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 16/965,256

(22) PCT Filed: Feb. 1, 2019

(86) PCT No.: PCT/JP2019/003589
§ 371 (c)(1),
(2) Date: Jul. 27, 2020

(87) PCT Pub. No.: WO2019/151473
PCT Pub. Date: Aug. 8, 2019

(30) Foreign Application Priority Data

Feb. 2, 2018 (JP) .............................. JP2018-017016

(51) Int. Cl.
*H04L 29/06* (2006.01)
*H04L 12/26* (2006.01)
(52) U.S. Cl.
CPC .......... *H04L 65/80* (2013.01); *H04L 43/0888* (2013.01); *H04L 43/16* (2013.01)

(58) Field of Classification Search
CPC ...................... H04N 21/442–21/44209; H04N 21/24–21/2408; H04L 65/10–65/1096; H04L 65/80; H04L 43/08–43/50
See application file for complete search history.

(56) References Cited

U.S. PATENT DOCUMENTS

2013/0346578 A1* 12/2013 Varki .................... H04L 45/125
709/223
2016/0043925 A1* 2/2016 Rodbro ................... H04L 47/18
370/252

(Continued)

OTHER PUBLICATIONS

Oliveira, "Forecasting Over-The-Top Bandwidth Consumption Applied to Network Operators", 2018, IEEE Symposium on Computers and Communications, p. 00859-00864 (Year: 2018).*

(Continued)

*Primary Examiner* — Clayton R Williams
(74) *Attorney, Agent, or Firm* — Fish & Richardson P.C.

(57) ABSTRACT

A quality prediction apparatus includes a first acquisition unit acquiring a first throughput for an access network of a terminal from the terminal, the terminal acquiring video data in a divided state from a plurality of video streaming servers, a second acquisition unit acquiring a second throughput for a core network to which the plurality of video streaming servers connect, the terminal being to acquire the video data from one of the video streaming servers, and a prediction unit selecting smaller one of the first throughput and the second throughput as a prediction value of a throughput for the video data to be acquired, and therefore, an efficient prediction of the throughput for the video data streaming can be enabled.

18 Claims, 6 Drawing Sheets

(56) References Cited

U.S. PATENT DOCUMENTS

2016/0234078 A1* 8/2016 Jana ................... H04L 67/02
2018/0288114 A1* 10/2018 Liu .................... H04L 65/602
2019/0114245 A1* 4/2019 Mermoud ............ H04L 43/12

OTHER PUBLICATIONS

Joshi, "A Review of Network Traffic Analysis and Prediction Techniques", 2015, School of Computer Sciences, North Maharashtra University, Jalgaon (M.S ) India , pp. 1-15 (Year: 2015).*
Thang et al., "Adaptive Streaming of Audiovisual Content using MPEG DASH," IEEE Transaction on Consumer Electronics, Feb. 2012, 58(1):78-85.

* cited by examiner

QUALITY PREDICTION APPARATUS, QUALITY PREDICTION METHOD AND PROGRAM

CROSS-REFERENCE TO RELATED APPLICATIONS

This application is a National Stage application under 35 U.S.C. § 371 of International Application No. PCT/JP2019/003589, having an International Filing Date of Feb. 1, 2019, which claims priority to Japanese Application Serial No. 2018-017016, filed on Feb. 2, 2018. The disclosure of the prior application is considered part of the disclosure of this application, and is incorporated in its entirety into this application

TECHNICAL FIELD

The present invention relates to a quality prediction apparatus, a quality prediction method, and a program.

BACKGROUND ART

It is important for a service provider involved in communication to predict a quality of communication for proper control operation to improve a quality of experience of a provided service. In a video streaming service, when high image quality video data with a high streaming bit rate is received (downloaded) and reproduced simultaneously in a low communication speed (throughput) environment, an event that reproduction is halfway stopped (reproduction interruption) occurs because the data does not arrive, and thus, the quality of experience is rather higher when downloading low image quality video data with a low streaming bit rate. Moreover, in a high throughput environment, the quality of experience is higher, when downloading video data having an image quality higher to such a degree that reproduction interruption does not occur.

Here, in the video streaming, an ABR (Adaptive Bitrate Selection) scheme is widespread which enables dynamic selection and switching of a streaming bit rate appropriate to a communication environment. A method for controlling the ABR scheme includes a technology in which a client terminal reproducing a video actually measures a throughput or buffer occupation amount of the video data that is downloaded while the video is being viewed to predict a throughput in the next downloading and determine a streaming bit rate (Non Patent Literature 1).

On the other hand, a streaming server accessed by the client terminal may be switched halfway through the video data for some reasons, and such a situation may occur even when the ABR scheme is adopted.

CITATION LIST

Non Patent Literature

Non Patent Literature 1: T. C. Thang, Q.-D. Ho, J. W. Kang, and A. T. Pham, "Adaptive streaming of audiovisual content using MPEG DASH," IEEE Trans. Consum. Electron., vol. 58, no. 1, pp. 78-85, February 2012.

SUMMARY OF THE INVENTION

Technical Problem

However, in the ABR, even in a situation in which switching of the streaming server causes the throughput to obviously change, the throughput and buffer occupation amount after the change are actually measured, and then prediction is performed. Thus, it takes time to select a proper streaming bit rate. For this reason, when data with a high streaming bit rate is acquired in a situation where the throughput changes to become lower, reproduction interruption possibly occurs and the quality of experience may disadvantageously decrease. When data with a low streaming bit rate is continuously acquired in a situation where the throughput changes to become higher, it is disadvantageous that the quality of experience may not increase.

An object of the present invention, which has been made in consideration of the above circumstance, is to enable an efficient prediction of a throughput for video data streaming.

Means for Solving the Problem

In order to solve the above problems, a quality prediction apparatus includes a first acquisition unit acquiring a first throughput for an access network of a terminal from the terminal, the terminal acquiring video data in a divided state from a plurality of video streaming servers, a second acquisition unit acquiring a second throughput for a core network to which the plurality of video streaming servers connect, the terminal being to acquire the video data from one of the video streaming servers, and a prediction unit selecting smaller one of the first throughput and the second throughput as a prediction value of a throughput for the video data to be acquired.

Effects of the Invention

The efficient prediction of the throughput for the video data streaming can be enabled.

DESCRIPTION OF EMBODIMENTS

Figure 1:
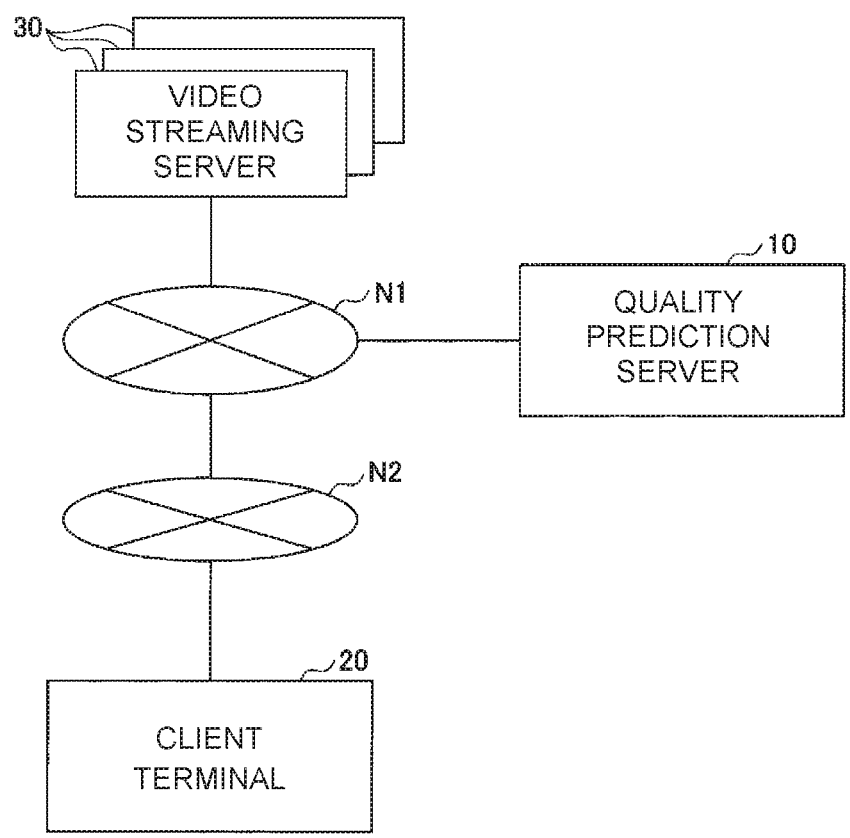
FIG. 1 is a diagram illustrating a network configuration example according to a first embodiment.

Hereinafter, a description is given of embodiments of the present invention on the basis of the drawings. FIG. 1 is a diagram illustrating a network configuration example according to a first embodiment. In FIG. 1, a plurality of video streaming servers 30 are connected with a quality prediction server 10 via a core network N1. On the other hand, a client terminal 20 is connected with the core network N1 via an access network N2. Accordingly, the client terminal 20 is communicable with the respective video streaming servers 30 or the quality prediction server 10 via the access network N2.

The video streaming servers 30 correspond to one or more computers that provide a video data (moving picture data) streaming service (hereinafter, referred to as "video streaming service") to the client terminal 20. The video data streaming in compliance with ABR (Adaptive Bitrate Streaming). Specifically, video data is re-encoded at some patterns of bit rates on a chunk basis and is stored in each of the video streaming servers 30, the chunk being an example of a unit of division per a certain time period. The embodiments assume a situation where source video streaming servers 30 of all chunks are not necessarily the same. In other words, a situation may be assumed that the video streaming servers 30 are switched halfway.

The client terminal 20 is a video data streaming destination in the video streaming service, and is a terminal that acquires and reproduces the streamed video data. For example, a PC (Personal Computer), a smartphone, a tablet terminal, or the like may be used as the client terminal 20.

The quality prediction server 10 corresponds to one or more computers that predict the throughput for the video data streaming when the client terminal 20 receives the video streaming service.

Figure 2:
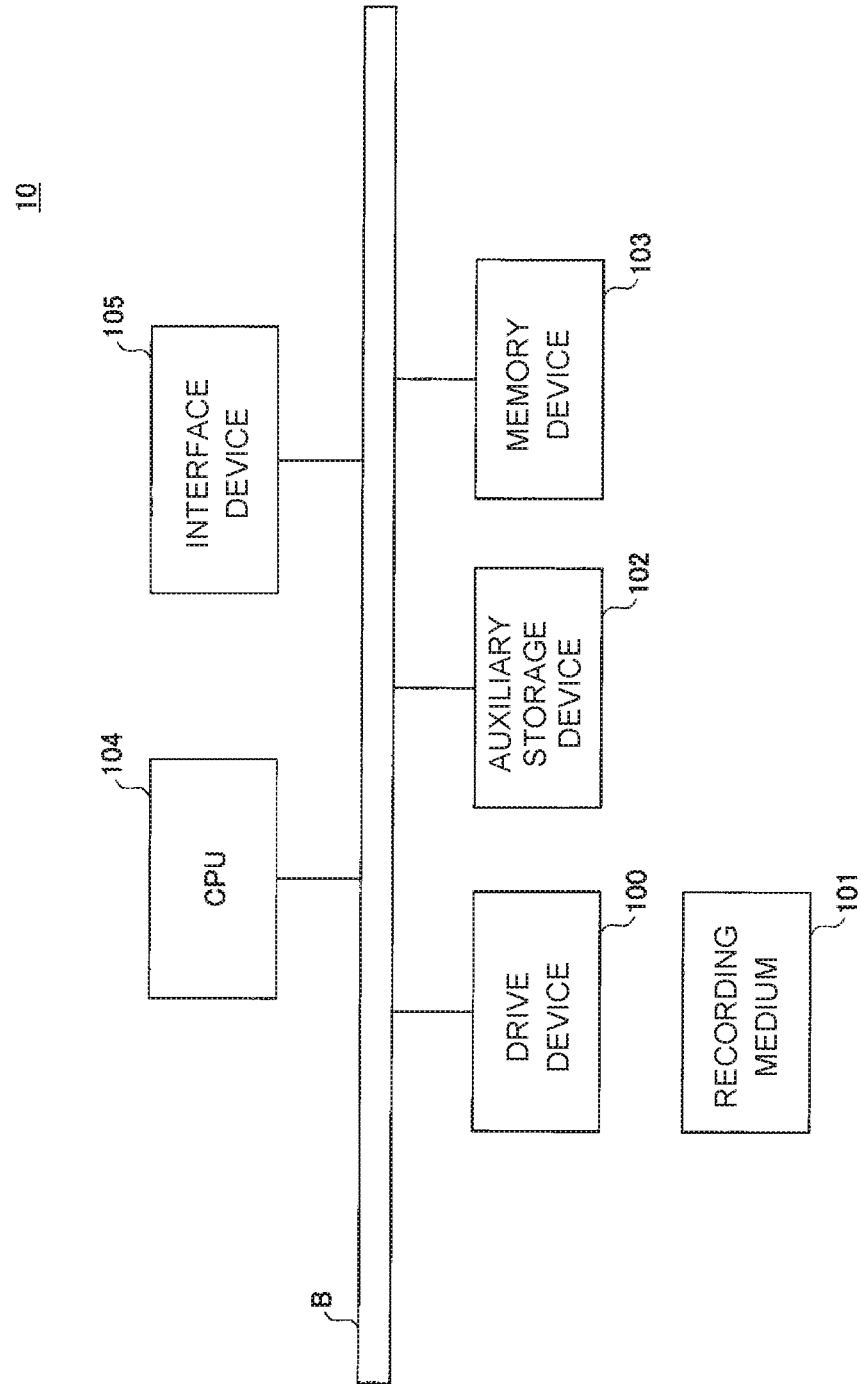
FIG. 2 is a diagram illustrating a hardware configuration example of a quality prediction server 10 according to the first embodiment.

FIG. 2 is a diagram illustrating a hardware configuration example of the quality prediction server 10 according to the first embodiment. The quality prediction server 10 illustrated in FIG. 2 includes a drive device 100, an auxiliary storage device 102, a memory device 103, a CPU 104, an interface device 105, and the like which are connected to each other via a bus B.

Programs implementing processes performed in the quality prediction server 10 are provided through a recording medium 101 such as a CD-ROM. when the recording medium 101 recording the programs is set in the drive device 100, the programs are installed from the recording medium 101 via the drive device 100 into the auxiliary storage device 102. However, the programs are not necessarily required to be installed from the recording medium 101, and may be downloaded from another computer via a network. The auxiliary storage device 102 stores therein the installed programs as well as necessary files, data, and the like.

The memory device 103 reads and stores therein a program from the auxiliary storage device 102 when instructed to start the program. The CPU 104 executes a function relating to the quality prediction server 10 in accordance with the program stored in the memory device 103. The interface device 105 is used as an interface for connecting to the network.

Note that the client terminal 20 and the video streaming server 30 may also include hardware like those illustrated in FIG. 2. The client terminal 20 desirably includes a display device, an input device receiving an input from a user, and the like.

Figure 3:
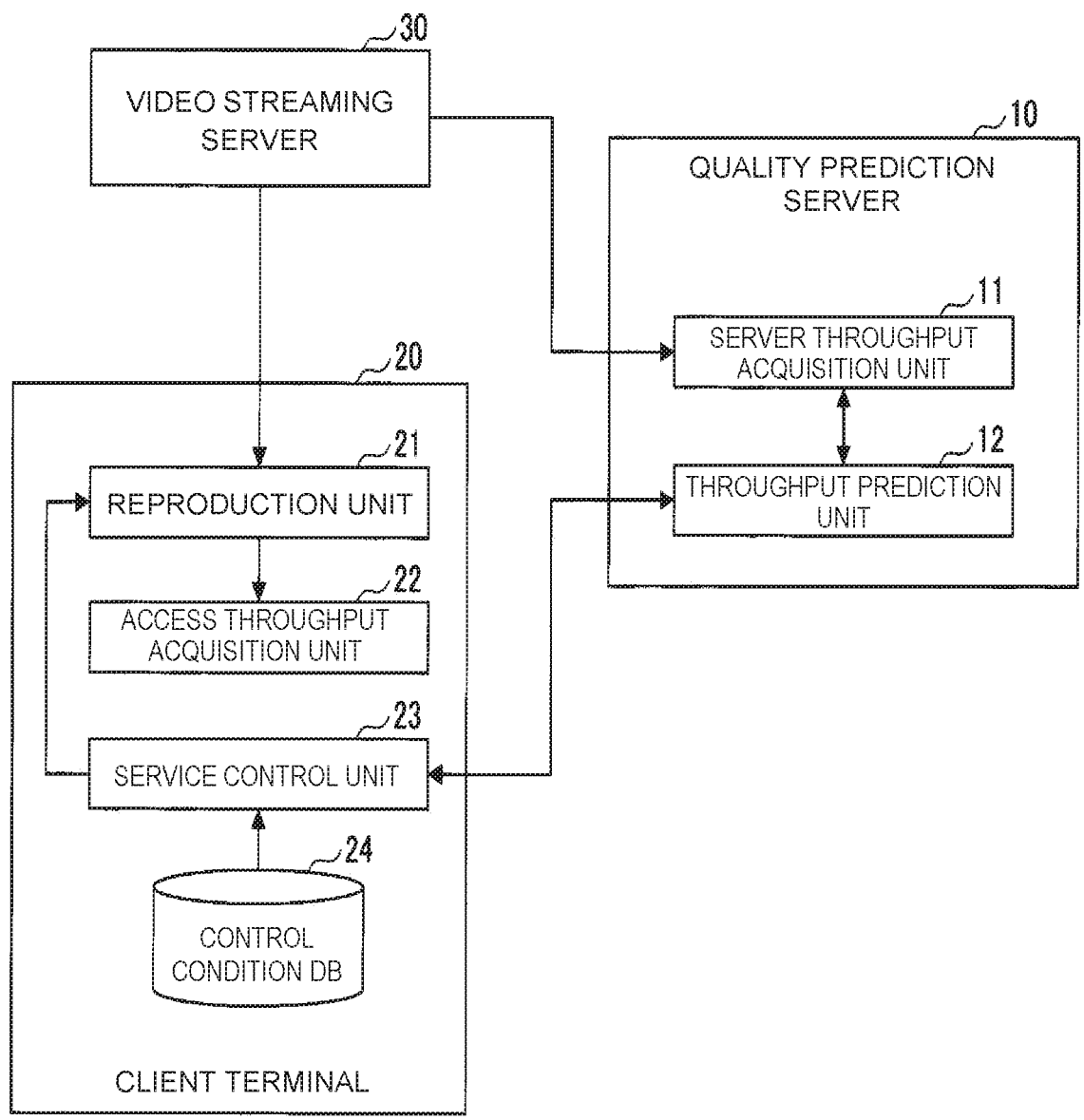
FIG. 3 is a diagram illustrating a functional configuration example according to the first embodiment.

FIG. 3 is a diagram illustrating a functional configuration example according to the first embodiment.

In FIG. 3, the client terminal 20 includes a reproduction unit 21, an access throughput acquisition unit 22, a service control unit 23, and the like. These respective units are implemented through processes which one or more programs installed in the client terminal 20 cause a CPU in the client terminal 20 to execute. The client terminal 20 uses also a control condition DB 24. The control condition DB 24 can be implemented using an auxiliary storage device in the client terminal 20 or a storage device connectible via a network to the client terminal 20, for example.

The quality prediction server 10 includes a server throughput acquisition unit 11, a throughput prediction unit 12, and the like. These respective units are implemented through processes which one or more programs installed in the quality prediction server 10 cause the CPU 104 to execute.

Note that an arrangement of the respective units illustrated in FIG. 3 is an example, and not limited to that illustrated in FIG. 3 so long as proper receiving/sending of input/output can be made between the units. For example, the client terminal 20 may include the throughput prediction unit 12, and the video streaming server 30 may include the service control unit 23 and the control condition DB 24.

The reproduction unit 21 acquires (downloads) the video data in a divided state on a chunk basis from the video streaming server 30 to reproduce the acquired chunks (video data).

The access throughput acquisition unit 22 measures a throughput in a download direction of the access network N2 to which the client terminal 20 connects (hereinafter, referred to as an "access throughput"). Specifically, the access throughput acquisition unit 22 downloads data for measurement from the quality prediction server 10 via the access network N2 to compute, based on a data size of the data for measurement and a time taken to download the data for measurement, a throughput for the download (hereinafter, referred to as an "access throughput"). Note that content of the data for measurement is not limited to those predetermined.

The server throughput acquisition unit 11 measures a throughput in a download direction of the core network N1 to which the video streaming server 30 connects, the client terminal 20 being to connect the video streaming server 30 (or, the client terminal 20 being to acquire the video data from the video streaming server 30) (hereinafter, referred to as a "server throughput"). Specifically, the server throughput acquisition unit 11 downloads the video data from that video streaming server 30 to compute, based on a data size of the video data and a time taken to download the video data, a throughput for the download (hereinafter, referred to as a "server throughput").

The throughput prediction unit 12 outputs, based on the access throughput and the server throughput, a prediction value of the throughput (hereinafter, referred to as a "predicted throughput").

The service control unit 23 receives, as input, the predicted throughput and a control condition group stored in the control condition DB 24 to select control conditions for maximizing or improving the quality of experience. Examples of the control condition include a bit rate, resolution, frame rate, and compression ratio for the video streaming, for example.

Hereinafter, a processing procedure performed in the first embodiment is described.

Figure 4:
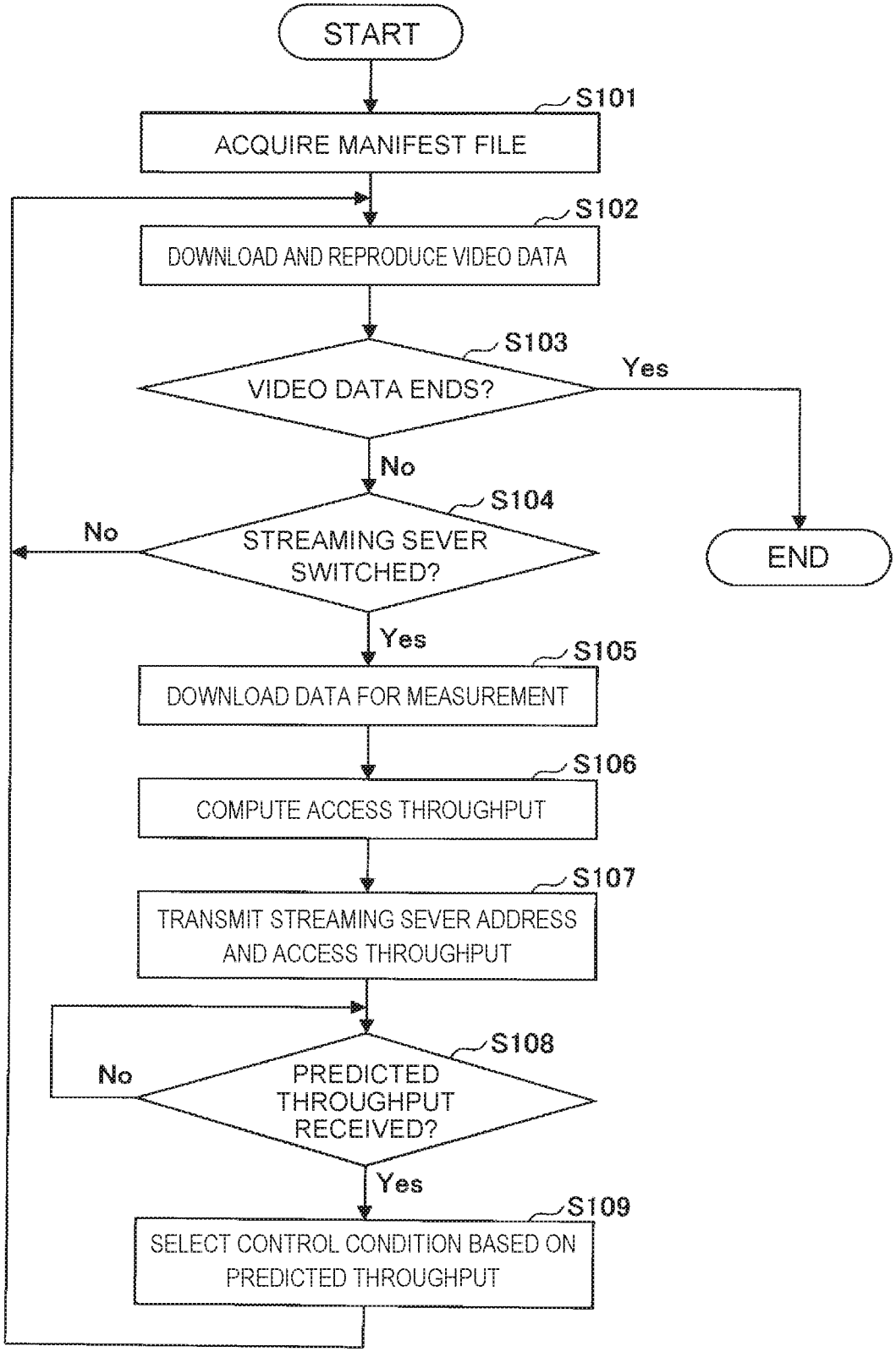
FIG. 4 is a flowchart illustrating an example of a processing procedure performed by a client terminal 20 according to the first embodiment.

FIG. 4 is a flowchart illustrating an example of the processing procedure performed by the client terminal 20 according to the first embodiment.

When a viewing instruction for video data is input by the user, the reproduction unit 21 acquires from the video streaming server 30 a manifest file for receiving the video data in a divided state on a chunk basis in an intermittent manner (S101). In the embodiment, an IP address of the source (download destination) video streaming server 30 of a chunk is described in the manifest file for each chunk. This is because the embodiment assumes a situation where the source video streaming servers 30 of all chunks are not necessarily the same.

Subsequently, the reproduction unit 21 downloads and reproduces the video data chunk by chunk on the basis of the manifest file (S102). when the reproduction unit 21 grasps, on the basis of the IP address of the video streaming server 30 for each chunk included in the manifest file, that the video streaming server 30 is to be switched in the future (Yes at S104) before all chunks of the video data are received (No at S103), the access throughput acquisition unit 22 downloads the data for measurement from the quality prediction server 10 via the access network N2 (S105). Note that the reproduction unit 21 inputs an IP address of a switching destination video streaming server 30 (hereinafter, referred to as a "switching destination address") into the service control unit 23.

Note that what the term "in the future" is targeted to is not limited to a chunk next to the last chunk among already downloaded chunks. Specifically, the reproduction unit 21 can grasp, based on the manifest file, the source video streaming servers 30 of all chunks after acquiring the manifest file. Therefore, when a video streaming server 30 of the last chunk is different from those of the chunks before the last chunk, it may be grasped that the video streaming server 30 is to be switched for the last chunk during reproduction of an initial chunk and the like, for example. That is, step S105 and subsequent steps may be performed out of synchronization with download of each chunk. By doing so, a state that the predicted throughput is already obtained can be expected when a chunk as a target of the predicted throughput is downloaded.

Subsequently, the access throughput acquisition unit 22 computes the access throughput by dividing the data size of the data for measurement by the time taken to download the data for measurement, and inputs the computed access throughput into the service control unit 23 (S106).

Subsequently, the service control unit 23 transmits the switching destination address and the access throughput to the throughput prediction unit 12 in the quality prediction server 10 (S107), and waits for the predicted throughput to be returned from the throughput prediction unit 12 (S108).

When the service control unit 23 receives the predicted throughput (Yes at S108), the service control unit 23 selects any control condition from among the control condition group stored in the control condition DB 24 on the basis of the predicted throughput (S109). For example, in a case of, in video reproduction, aiming at no reproduction interruption caused by depletion of data stored in the buffer and the most improvement in an image quality (bit rate), the control condition DB 24 stores therein minimum required throughputs (required throughputs) for smoothly performing reproduction corresponding to the image qualities without interruption with options as the image qualities. In this case, the service control unit 23 compares the predicted throughput with the required throughputs of the respective image qualities, and selects a control condition that the image quality is the highest in the options with the required throughput not exceeding the predicted throughput.

In subsequent step S102, when downloading a chunk from the video streaming server 30 relating to the switching destination address, the reproduction unit 21 downloads the video data from the video streaming server 3 in accordance with the selected control condition. For example, the reproduction unit 21 specifies the bit rate relating to the selected control condition to download the video data from the video streaming server 30.

Note that steps S105 to S109 in FIG. 4 may be performed also for the initial chunk (an initially connected video streaming server 30).

The access throughput acquisition unit 22 may measure (compute) the access throughput only once at a start of viewing (when the viewing instruction is input) to store the measured (computed) access throughput in the auxiliary storage device or the like. In this case, the subsequent steps S105 and S106 may not be performed to use the stored access throughput.

Figure 5:
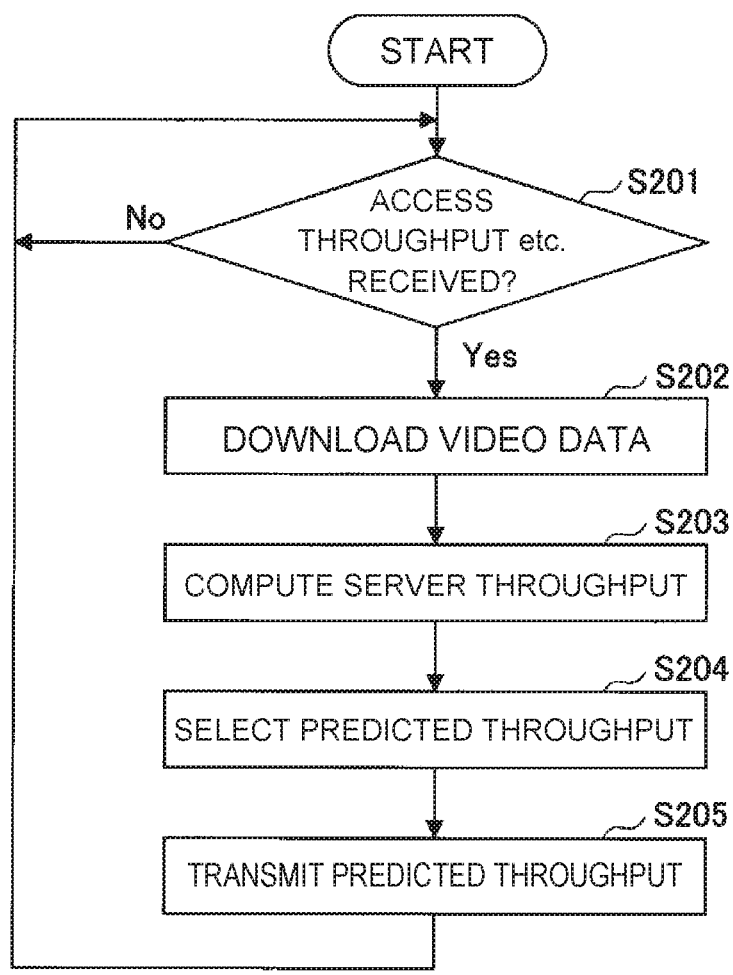
FIG. 5 is a flowchart illustrating an example of a processing procedure performed by the quality prediction server 10 according to the first embodiment.

FIG. 5 is a flowchart illustrating an example of a processing procedure performed by the quality prediction server 10 according to the first embodiment.

When the throughput prediction unit 12 receives the switching destination address and the access throughput (Yes at S201), the throughput prediction unit 12 inputs that switching destination address and that access throughput into the server throughput acquisition unit 11. Subsequently, the server throughput acquisition unit 11 downloads the video data from the video streaming server 30 relating to the switching destination server address via the core network N1 (S202). The relevant video data may be video data independent from the video data to be viewed, or data having a format different from the video data.

Subsequently, the server throughput acquisition unit 11 computes the server throughput by dividing the data size of the video data by the time taken to download the video data, and outputs the computed server throughput to the throughput prediction unit 12 (S203).

Subsequently, the throughput prediction unit 12 compares the access throughput received in step S201 with the server throughput, and selects the smaller one as the predicted throughput (S204). Subsequently, the throughput prediction unit 12 transmits the predicted throughput to the service control unit 23 in the client terminal 20 transmitting the access throughput (S205). The relevant predicted throughput is a prediction value of the throughput for the download of the chunk relating to the switching destination address from the video streaming server 30 relating to the switching destination address.

Note that the server throughput acquisition unit 11 may perform steps S202 and S203 only once every certain time period to store the value of the server throughput, and for a certain time period after that, may use the stored value without performing steps S202 and S203.

Next, a description is given of a second embodiment. In the second embodiment, differences from the first embodiment are described. Those not specifically described in the second embodiment may be similar to the first embodiment.

In the second embodiment, the server throughput acquisition unit 11 acquires, as the server throughput, an upper limit value of the throughput that is limited in terms of design in the video streaming server 30 from the video streaming server 30, instead of performing steps S202 and S203 in FIG. 5.

Next, a description is given of a third embodiment. In the third embodiment, differences from the first or second embodiment are described. Those not specifically described in the third embodiment may be similar to the first or second embodiment.

In the third embodiment, the access throughput acquisition unit 22 acquires, as a value of the access throughput, an upper limit value of the throughput in the download direction of the access network N2, the throughput being limited in terms of service in the access network N2 to which the client terminal 20 connects, from network information stored in the client terminal 20, instead of performing steps S105 and S106 in FIG. 4.

Next, a description is given of a fourth embodiment. In the fourth embodiment, differences from the first, second, or third embodiment are described. Those not specifically described in the fourth embodiment may be similar to the first, second, or third embodiment.

Figure 6:
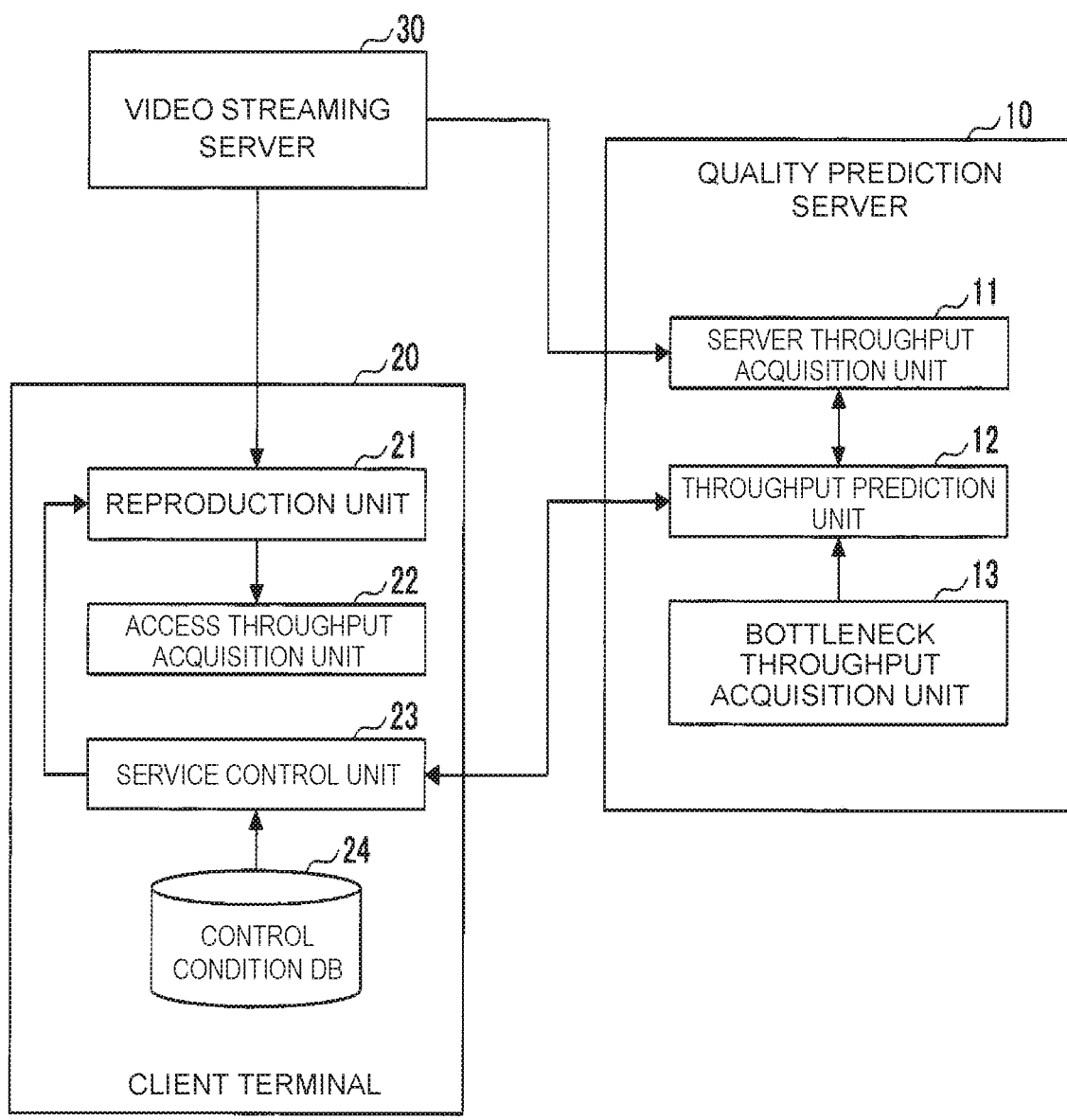
FIG. 6 is a diagram illustrating a functional configuration example according to a fourth embodiment.

FIG. 6 is a diagram illustrating a functional configuration example according to the fourth embodiment. In FIG. 6, the same component as in FIG. 3 is designated by the same reference numeral, and the description thereof is omitted.

In FIG. 6, the quality prediction server 10 further includes a bottleneck throughput acquisition unit 13. The bottleneck throughput acquisition unit 13 is implemented through processes which one or more programs installed in the quality prediction server 10 cause the CPU 104 to execute.

The bottleneck throughput acquisition unit 13 acquires a throughput for a portion (bottleneck) where a band is limited in the core network N1 (where a band is relatively narrower than other portion) (hereinafter, referred to as a "bottleneck throughput") from inside the core network N1, and inputs the acquired bottleneck throughput into the throughput prediction unit 12. The bottleneck throughput may be specified by the bottleneck throughput acquisition unit 13 inquiring of each of network devices (router and the like) in the core network N1 about a throughput in the network device.

Alternatively, the bottleneck throughput acquisition unit 13 may inquire of a network device set in advance as a portion to be experimentally a bottleneck about a throughput to use the throughput as the bottleneck throughput.

Note that the bottleneck throughput may be acquired in step S202 and subsequent steps in FIG. 5, or once every certain time period. In the latter case, the bottleneck throughput may be stored to use the stored value in a later certain time period.

The throughput prediction unit 12 compares the access throughput, the server throughput, and the bottleneck throughput with each other, and selects the smallest one as the predicted throughput in step S204 in FIG. 5.

As described above, according to the above embodiments, the efficient prediction of the throughput for the video data streaming can be enabled even in the case that the video streaming server 30 is switched. In other words, the throughput can be predicted to select the proper streaming bit rate without actually measuring the throughput and the buffer occupation amount when the video streaming server 30 is switched.

Note that in the above embodiments, the quality prediction server 10 is an example of the quality prediction apparatus. The client terminal 20 is an example of the terminal. The throughput prediction unit 12 is an example of a first acquisition unit and the throughput prediction unit 12. The server throughput acquisition unit 11 is an example of a second acquisition unit. The bottleneck throughput acquisition unit 13 is an example of a third acquisition unit. The data for measurement is an example of first data. The video data downloaded by the server throughput acquisition unit 11 is an example of second data. The access throughput is an example of a first throughput. The server throughput is an example of a second throughput. The bottleneck throughput is an example of a third throughput.

Hereinabove, the embodiments of the present invention are described, but the present invention is not limited to those specific embodiments, and various modifications and changes may be made within a scope of the gist of the present invention described in claims.

REFERENCE SIGNS LIST

10 Quality prediction server
11 Server throughput acquisition unit
12 Throughput prediction unit
13 Bottleneck throughput acquisition unit
20 Client terminal
21 Reproduction unit
22 Access throughput acquisition unit
23 Service control unit
24 Control condition DB
30 Video streaming server
100 Drive device
101 Recording medium
102 Auxiliary storage device
103 Memory device
104 CPU
105 Interface device
B Bus

The invention claimed is:

1. A quality prediction apparatus comprising:
a first acquisition unit, including one or more processors, adapted to acquire a first throughput for an access network of a terminal from the terminal, the terminal adapted to acquire video data in a divided state from a plurality of video streaming servers;
a second acquisition unit, including one or more processors, adapted to acquire a second throughput for a core network to which the plurality of video streaming servers connect, the terminal adapted to acquire the video data from one of the video streaming servers; and
a prediction unit, including one or more processors, adapted to select smaller one of the first throughput and the second throughput as a prediction value of a throughput for the video data to be acquired.

2. The quality prediction apparatus according to claim 1, wherein
the first acquisition unit is adapted to acquire a throughput as the first throughput by the terminal downloading first data via the access network to compute based on a data size of the first data and a time taken to download the first data.

3. The quality prediction apparatus according to claim 1, wherein
the second acquisition unit is adapted to download second data from one of the video streaming servers from which the terminal is to acquire the video data via the core network, and is adapted to compute the second throughput based on a data size of the second data and a time taken to download the second data.

4. The quality prediction apparatus according to claim 1, wherein
the first acquisition unit is adapted to acquire, as the first throughput, an upper limit value of a throughput in the access network.

5. The quality prediction apparatus according to claim 1, wherein
the second acquisition unit is adapted to acquire, as the second throughput, an upper limit value of a throughput limited in one of the video streaming servers from which the terminal is to acquire the video data.

6. The quality prediction apparatus according to claim 1, further comprising:
a third acquisition unit adapted to acquire a third throughput for a portion where a band is limited in the core network, wherein
the prediction unit is adapted to select, as a prediction value of the throughput for the video data to be acquired, a minimum value among the first throughput, the second throughput, and the third throughput.

7. A quality prediction method comprising:
a first acquisition procedure acquiring a first throughput for an access network of a terminal from the terminal, the terminal acquiring video data in a divided state from a plurality of video streaming servers;
a second acquisition procedure acquiring a second throughput for a core network to which the plurality of video streaming servers connect, the terminal being to acquire the video data from one of the video streaming servers; and
a prediction procedure selecting smaller one of the first throughput and the second throughput as a prediction value of a throughput for the video data to be acquired,
wherein the first acquisition procedure, the second acquisition procedure, and the prediction procedure are executed by a computer.

8. The quality prediction method according to claim 7, wherein
the first acquisition procedure acquires a throughput as the first throughput by the terminal downloading first data via the access network to compute based on a data size of the first data and a time taken to download the first data.

9. The quality prediction method according to claim 7, wherein
the second acquisition procedure downloads second data from one of the video streaming servers from which the terminal is to acquire the video data via the core network, and computes the second throughput based on a data size of the second data and a time taken to download the second data.

10. The quality prediction method according to claim 7, wherein
the first acquisition procedure acquires, as the first throughput, an upper limit value of a throughput in the access network.

11. The quality prediction method according to claim 7, wherein
the second acquisition procedure acquires, as the second throughput, an upper limit value of a throughput limited in one of the video streaming servers from which the terminal is to acquire the video data.

12. The quality prediction method according to claim 7, further comprising:
a third acquisition procedure acquiring a third throughput for a portion where a band is limited in the core network, wherein
the prediction procedure selects, as a prediction value of the throughput for the video data to be acquired, a minimum value among the first throughput, the second throughput, and the third throughput.

13. A non-transitory computer readable medium storing one or more instructions causing a computer to execute:
a first acquisition procedure acquiring a first throughput for an access network of a terminal from the terminal, the terminal acquiring video data in a divided state from a plurality of video streaming servers;
a second acquisition procedure acquiring a second throughput for a core network to which the plurality of video streaming servers connect, the terminal being to acquire the video data from one of the video streaming servers; and
a prediction procedure selecting smaller one of the first throughput and the second throughput as a prediction value of a throughput for the video data to be acquired.

14. The non-transitory computer readable medium according to claim 13, wherein
the first acquisition procedure acquires a throughput as the first throughput by the terminal downloading first data via the access network to compute based on a data size of the first data and a time taken to download the first data.

15. The non-transitory computer readable medium according to claim 13, wherein
the second acquisition procedure downloads second data from one of the video streaming servers from which the terminal is to acquire the video data via the core network, and computes the second throughput based on a data size of the second data and a time taken to download the second data.

16. The non-transitory computer readable medium according to claim 13, wherein
the first acquisition procedure acquires, as the first throughput, an upper limit value of a throughput in the access network.

17. The non-transitory computer readable medium according to claim 13, wherein
the second acquisition procedure acquires, as the second throughput, an upper limit value of a throughput limited in one of the video streaming servers from which the terminal is to acquire the video data.

18. The non-transitory computer readable medium according to claim 13, wherein the one or more instructions further cause the computer to execute:
a third acquisition procedure acquiring a third throughput for a portion where a band is limited in the core network, wherein
the prediction procedure selects, as a prediction value of the throughput for the video data to be acquired, a minimum value among the first throughput, the second throughput, and the third throughput.

* * * * *